United States Patent
Yamaneki et al.

(10) Patent No.: US 9,203,983 B2
(45) Date of Patent: Dec. 1, 2015

(54) IMAGE FORMING APPARATUS AND IMAGE DATA PROCESSING METHOD

(75) Inventors: Kazushi Yamaneki, Osaka (JP); Manabu Matsumoto, Osaka (JP); Kazuma Ogawa, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 322 days.

(21) Appl. No.: 13/310,112

(22) Filed: Dec. 2, 2011

(65) Prior Publication Data
US 2012/0147406 A1    Jun. 14, 2012

(30) Foreign Application Priority Data

Dec. 8, 2010  (JP) ................................. 2010-273393
Dec. 8, 2010  (JP) ................................. 2010-273394

(51) Int. Cl.
*G06F 15/00*  (2006.01)
*H04N 1/403*  (2006.01)
*G03F 3/08*  (2006.01)
*H04N 1/00*  (2006.01)

(52) U.S. Cl.
CPC ......... *H04N 1/00217* (2013.01); *H04N 1/0022* (2013.01); *H04N 1/00225* (2013.01); *H04N 1/00411* (2013.01); *H04N 1/00421* (2013.01); *H04N 1/00424* (2013.01); *H04N 1/00448* (2013.01); *H04N 1/00453* (2013.01); *H04N 1/00474* (2013.01); *H04N 1/00482* (2013.01); *H04N 1/00803* (2013.01); *H04N 1/00811* (2013.01); *H04N 1/00824* (2013.01); *H04N 2201/0094* (2013.01)

(58) Field of Classification Search
CPC  H04N 1/0021; H04N 1/0022; H04N 1/00421

USPC .......................... 358/1.1, 1.18, 1.9, 448, 1.14
See application file for complete search history.

(56) References Cited

U.S. PATENT DOCUMENTS

| | | | |
|---|---|---|---|
| 6,982,801 B1 * | 1/2006 | Saito | 358/1.15 |
| 7,660,555 B2 * | 2/2010 | Morita | 399/382 |
| 8,270,025 B2 * | 9/2012 | Xu | 358/1.6 |
| 8,699,043 B2 * | 4/2014 | Gotoh et al. | 358/1.13 |
| 2002/0124167 A1 * | 9/2002 | Toyota et al. | 713/150 |
| 2004/0125407 A1 * | 7/2004 | Nishikawa et al. | 358/1.18 |
| 2005/0190382 A1 * | 9/2005 | van Os | 358/1.1 |

(Continued)

FOREIGN PATENT DOCUMENTS

| | | |
|---|---|---|
| JP | 2002-116665 | 4/2002 |
| JP | 2006-180343 | 7/2006 |

(Continued)

*Primary Examiner* — Akwasi M Sarpong
(74) *Attorney, Agent, or Firm* — Renner, Otto, Boisselle & Sklar, LLP

(57) ABSTRACT

A user is enabled to make different selection as to whether or not to include a blank page for each data processing. A storage portion stores setting information indicating whether or not to perform data processing of image data with a blank page excluded for each data processing, and a control portion judges whether or not each data processing is processing performed with a blank page of the image data excluded based on the setting information stored in the storage portion, and executes first data processing which is judged as processing performed with the blank page excluded by excluding the blank page as well as executes second data processing which is judged as processing performed without excluding the blank page concurrently with the first data processing by including the blank page.

9 Claims, 13 Drawing Sheets

(56) References Cited

U.S. PATENT DOCUMENTS

| | | | |
|---|---|---|---|
| 2005/0276641 A1* | 12/2005 | Morita | 399/382 |
| 2006/0010219 A1* | 1/2006 | Saito | 709/206 |
| 2007/0211296 A1* | 9/2007 | Toda | 358/1.18 |
| 2007/0244977 A1* | 10/2007 | Atkins | 709/206 |
| 2009/0033958 A1 | 2/2009 | Torii | |
| 2009/0190146 A1* | 7/2009 | Xu | 358/1.9 |
| 2010/0002259 A1 | 1/2010 | Maruyama et al. | |
| 2010/0053682 A1* | 3/2010 | Gotoh et al. | 358/1.15 |
| 2010/0271645 A1* | 10/2010 | Nakabayashi | 358/1.9 |
| 2011/0128577 A1* | 6/2011 | Miyata | 358/1.15 |

FOREIGN PATENT DOCUMENTS

| | | |
|---|---|---|
| JP | 2008-245148 A | 10/2008 |
| JP | 2010-016770 | 1/2010 |
| JP | 2010-056803 | 3/2010 |

* cited by examiner

FIG. 8
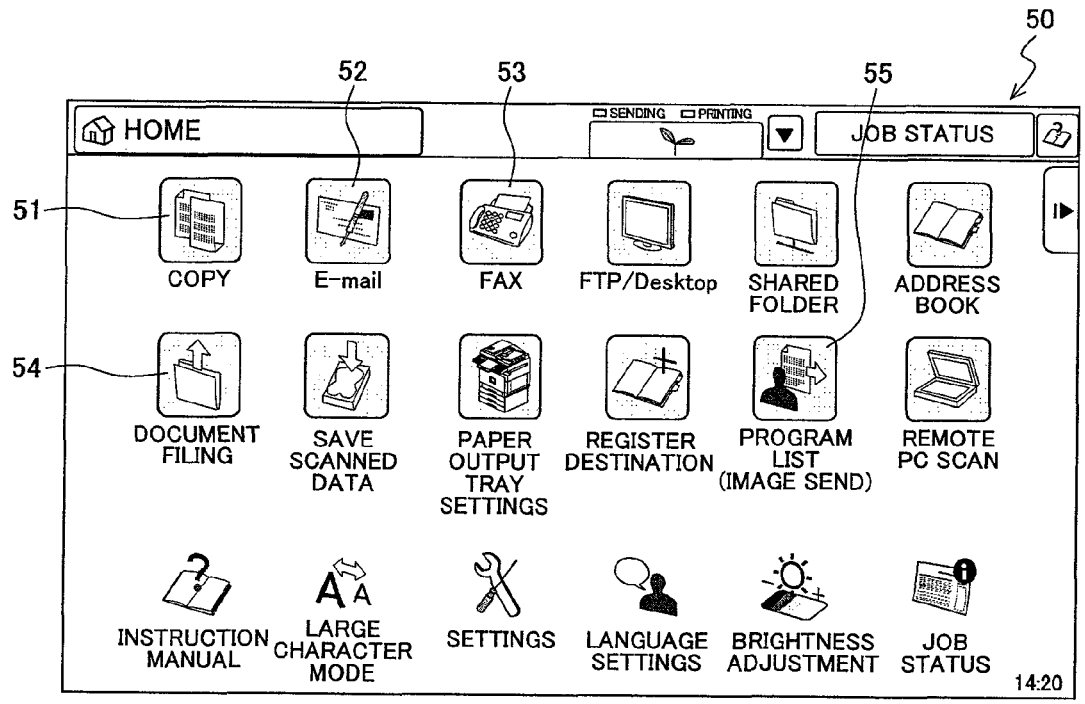
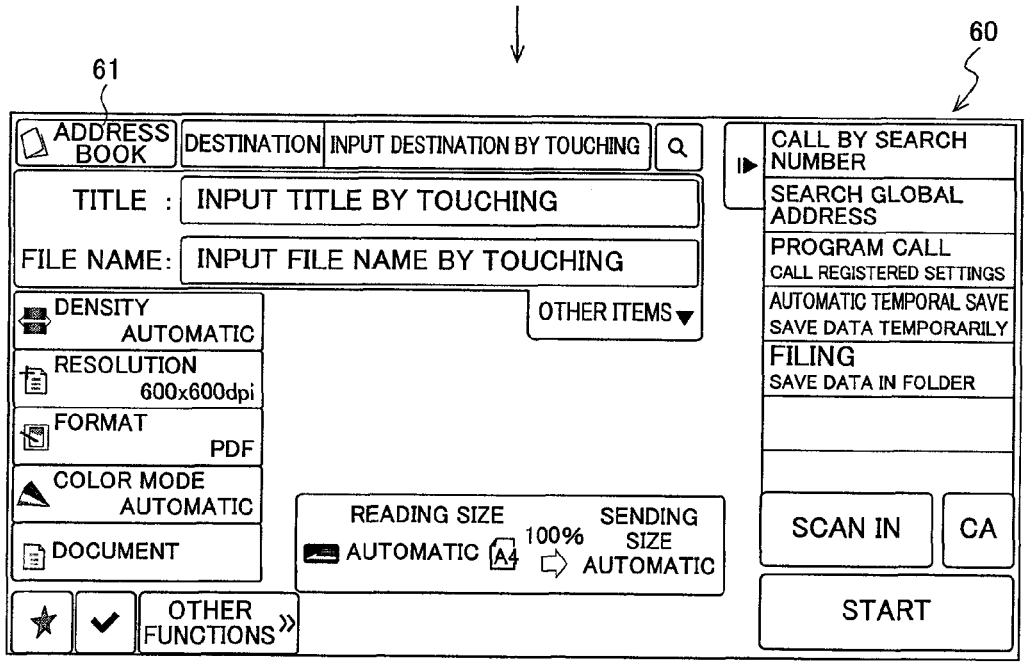
TO FIG. 9

FIG. 9
FROM FIG. 8
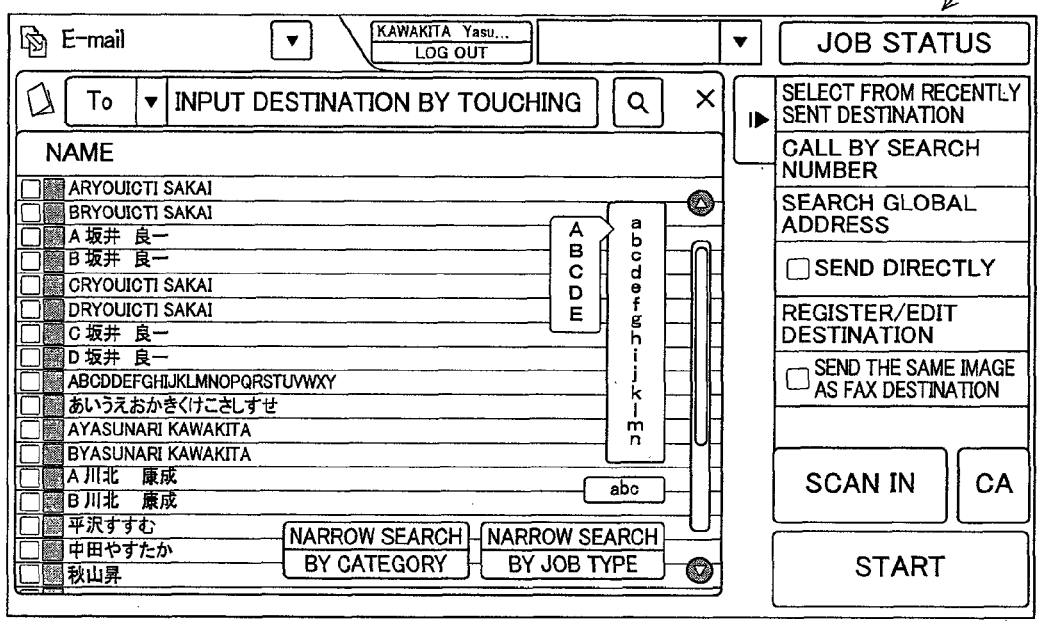
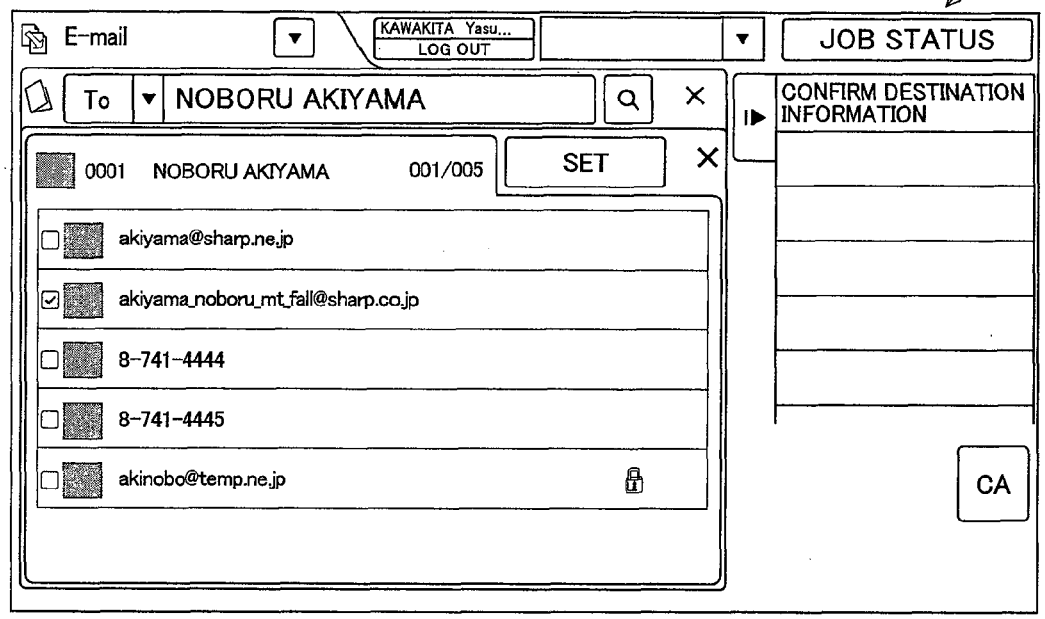
TO FIG. 10

FIG. 10

FROM FIG. 9
↓

60

| ADDRESS BOOK | DESTINATION | akinobo@temp.ne.jp | 🔍 | ▶ | CALL BY SEARCH NUMBER |
|---|---|---|---|---|---|

TITLE : INPUT TITLE BY TOUCHING
FILE NAME: INPUT FILE NAME BY TOUCHING

- DENSITY AUTOMATIC
- RESOLUTION 600x600dpi
- FORMAT PDF
- COLOR MODE AUTOMATIC
- DOCUMENT

OTHER ITEMS ▼

READING SIZE AUTOMATIC 100% SENDING SIZE AUTOMATIC

CALL BY SEARCH NUMBER
CONFIRM DESTINATION
PROGRAM CALL — CALL REGISTERED SETTINGS
AUTOMATIC TEMPORAL SAVE — SAVE DATA TEMPORARILY
FILING — SAVE DATA IN FOLDER

SCAN IN | CA
START

☆ ✓ OTHER FUNCTIONS »
62

↓

90

| OTHER FUNCTIONS | | | × | ▶ | SELECT MAGNIFICATION AUTOMATICALLY — COPY IN ACCORDANCE WITH SHEET OF PAPER |
|---|---|---|---|---|---|

| SORT/GROUP | PUNCH | PAPER FOLD |
|---|---|---|
| PAPER OUTPUT TRAY | EDIT PREVIEW | PAGE AGGREGATION |
| BINDING MARGIN | ERASE FRAME | BINDING IN MIDDLE POSITION |
| COVER/INSERTION | OHP INSERTION | SKIP BLANK SHEET |
| CARD SCAN | MOVE COPY | TAB COPY |
| 1 SET 2 COPIES | BOOK REPLICATION | BOOK DIVISION |
| PRINT MENU | CUSTOM IMAGE | WOVEN PATTERN PRINT |

REGISTER PROGRAM — REGISTER CURRENT SETTINGS
AUTOMATIC TEMPORAL SAVE — SAVE DATA TEMPORARILY
FILING — SAVE DATA IN FOLDER
CALL SETTING USED LAST
CALL ECO PROGRAM

SCAN IN | CA
MONOCHROME START ● | COLOR START ○○●

☆ ✓ OTHER FUNCTIONS »

91
↓
TO FIG. 11

FIG. 14
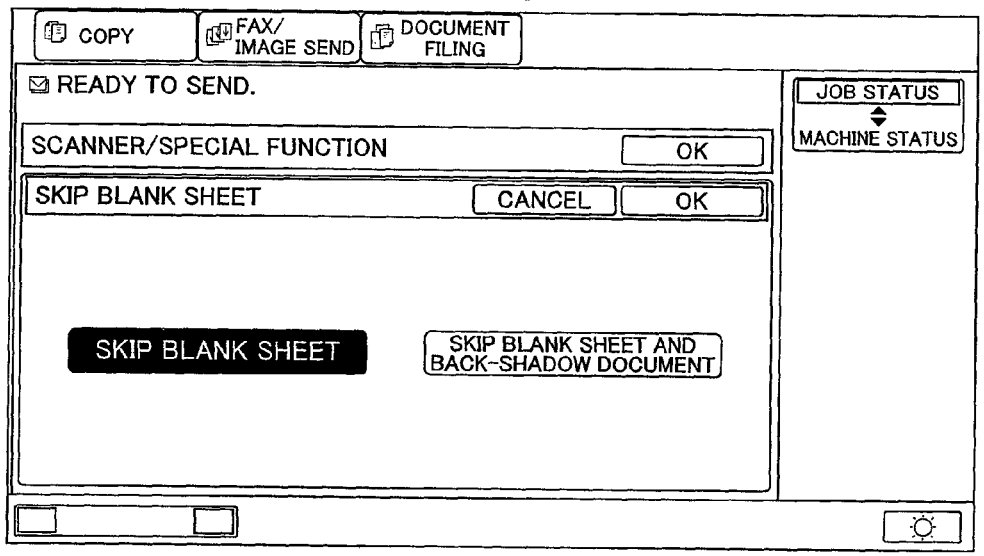
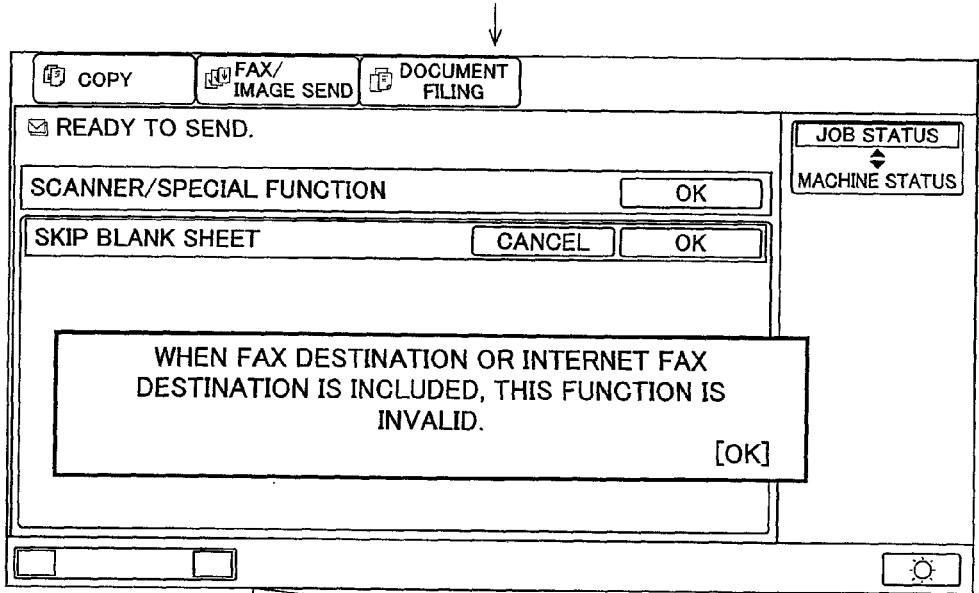
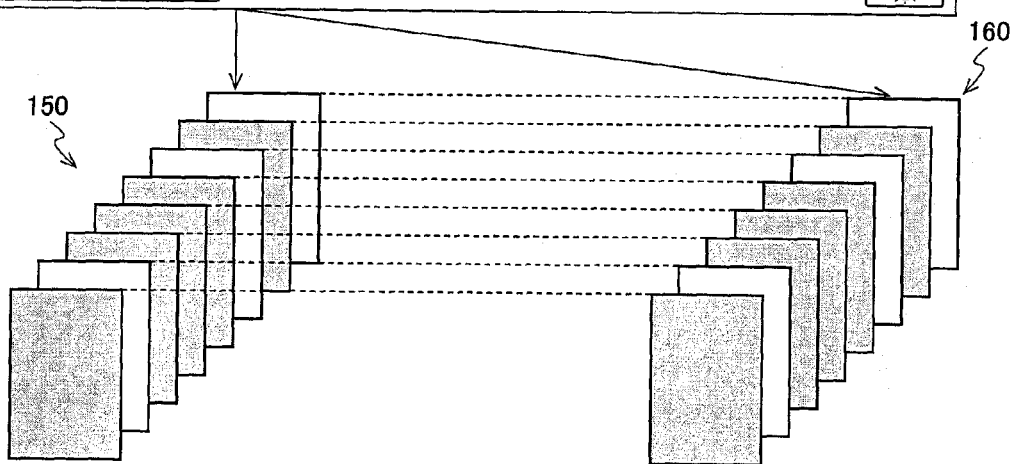

IMAGE FORMING APPARATUS AND IMAGE DATA PROCESSING METHOD

CROSS-NOTING PARAGRAPH

This non-provisional application claims priority under 35 U.S.C. §119 (a) on Patent Applications No. 2010-273393 filed in JAPAN on Dec. 8, 2010 and 2010-273394 filed in JAPAN on Dec. 8, 2010, the entire contents of which are hereby incorporated herein by reference.

FIELD OF THE INVENTION

The present invention relates to an image forming apparatus and an image data processing method for performing a plurality of different data processing concurrently for image data including a blank page.

BACKGROUND OF THE INVENTION

Conventionally, a multi-functional peripheral having a scan function, a document filing function, a network transmission function, a print function, an electronic mail transmission function, and a facsimile transmission function has been widely used. In the multi-functional peripheral, when a document is scanned, the scanned document can be filed as electronic data directly, transmitted through a network, printed, transmitted by an electronic mail, or transmitted by facsimile.

When a document is scanned in such a multi-functional peripheral, there is a case where the scanned document includes a blank page. Thus, technologies have been proposed that an alert is given when a blank page is scanned (see Japanese Laid-Open Patent Publication No. 2002-116665), when there is a blank page, preview display is performed to cause a user to confirm the scanned content (see Japanese Laid-Open Patent Publication No. 2010-16770), preview display is performed with a blank page skipped (see Japanese Laid-Open Patent Publication No. 2010-56803), or pages other than a blank page are transmitted by facsimile or an electronic mail (see Japanese Laid-Open Patent Publication No. 2006-180343).

Moreover, a multi-functional peripheral capable of transmitting the same document image which has been scanned to a plurality of destinations by facsimile and an electronic mail concurrently has been also developed. However, a document transmitted by an electronic mail can not be used as a formal document, because even if the document has a seal thereon and color print is performed on the side of an apparatus which has received the electronic mail, the document image can be altered. On the other hand, since it is highly difficult to alter a document image transmitted by facsimile, the document image is treated as being equivalent to a formal document, and a document which needs to be saved as evidence, such as an order form and a slip is transmitted by facsimile.

Note that, when a document image is used as being equivalent to a formal document, exclusion of a blank page is not admitted. In the conventional multi-functional peripheral, when the same document which has been scanned is transmitted by facsimile and an electronic mail concurrently, image data of the document is transmitted with a blank page included even in the transmission by the electronic mail according to the condition of the facsimile transmission. FIG. 14 is a view for explaining conventional processing for transmitting image data of a document. As shown in FIG. 14, when facsimile transmission is included in data processing to be executed, a blank page is included in both image data 150 for electronic mail transmission and image data 160 for facsimile transmission.

However, in the above described conventional technologies, when image data of a scanned document is transmitted by facsimile and an electronic mail concurrently, the document is transmitted with a blank page included in both the electronic mail transmission and the facsimile transmission, thus posing a problem that a user can not make different selection as to whether or not to include a blank page for each image data processing such as electronic mail transmission and facsimile transmission.

SUMMARY OF THE INVENTION

An object of the present invention is to provide an image forming apparatus and an image data processing method allowing a user to make different selection as to whether or not to include a blank page for each data processing.

An object of the present invention is to provide an image forming apparatus performing a plurality of different data processing concurrently for image data including a blank page, comprising: a storage portion for storing setting information indicating whether or not to perform data processing of the image data with a blank page excluded for each of the data processing, and a control portion for judging whether or not each data processing is processing performed with a blank page of the image data excluded based on the setting information stored in the storage portion, and executing first data processing which is judged as processing performed with the blank page excluded by excluding the blank page as well as executing second data processing which is judged as processing performed without excluding the blank page, by including concurrently with the first data processing the blank page.

Another object of the present invention is to provide the image forming apparatus, wherein the control portion executes first display processing for displaying, by excluding the blank page, image data which is a processing target of the first data processing which is judged as processing performed with the blank page excluded, and executes second display processing for displaying, by including the blank page, image data which is a processing target of the second data processing which is judged as processing performed without excluding the blank page concurrently with the first display processing.

Another object of the present invention is to provide the image forming apparatus, wherein the control portion switches the first display processing, the second display processing executed concurrently with the first display processing, and display processing for displaying each page of the image data with the blank page included, based on an instruction from a user.

Another object of the present invention is to provide the image forming apparatus, wherein the control portion displays each page of image data serving as a target of the first data processing and the second data processing by thumbnail display.

Another object of the present invention is to provide the image forming apparatus, wherein the control portion switches processing to be executed from the first data processing or the second data processing to third data processing based on an instruction from a user, and when the third data processing is judged as processing executed with a blank page of the image data excluded, executes the third data processing with the blank page excluded, and when the third data processing is judged as processing executed without excluding the blank page of the image data, executes the third data processing without excluding the blank page.

Another object of the present invention is to provide the image forming apparatus, wherein the control portion displays the image data as a processing target of the third data processing with the blank page excluded when the third data processing is judged as processing executed with a blank page of the image data excluded, and when the third data processing is judged as processing executed without excluding the blank page of the image data, executes third display processing for displaying the image data as a processing target of the third data processing without excluding the blank page, in place of the first display processing corresponding to the first data processing or the second display processing corresponding to the second data processing which has been switched.

Another object of the present invention is to provide the image forming apparatus, wherein a plurality of the different data processing is processing performed by a plurality of different functions of the image forming apparatus.

Another object of the present invention is to provide the image forming apparatus, wherein a plurality of the different functions includes at least two of a document filing function of image data, a data transmission function through a network, a print function, a copy function, a facsimile function, and an electronic mail transmission function.

Another object of the present invention is to provide the image forming apparatus, wherein a plurality of the different data processing includes data processing in which a destination to which image data is transmitted is different.

Another object of the present invention is to provide an image data processing method for performing a plurality of different data processing concurrently for image data including a blank page, comprising: an information reading step of reading out setting information from a storage portion storing the setting information indicating whether or not to perform data processing of the image data with a blank page excluded for each of the data processing, and a data processing executing step of judging whether or not each data processing is processing performed with a blank page of the image data excluded based on the setting information read out at the information reading step, and executing first data processing which is judged as processing performed with the blank page excluded by excluding the blank page as well as executing second data processing which is judged as processing performed without excluding the blank page, concurrently with the first data processing by including the blank page.

Another object of the present invention is to provide the image data processing method, further comprising: at the data processing executing step, a display step of executing first display processing for displaying, by excluding the blank page, image data which is a processing target of the first data processing which is judged as processing performed with the blank page excluded, and executing second display processing for displaying, by including the blank page, image data which is a processing target of the second data processing which is judged as processing performed without excluding the blank page concurrently with the first display processing.

BRIEF DESCRIPTION OF THE DRAWINGS

FIG. 8 is an exemplary screen displayed on a display portion in data processing of image data;

FIG. 9 is an exemplary screen displayed on the display portion in data processing of image data;

FIG. 10 is an exemplary screen displayed on the display portion in data processing of image data;

FIG. 14 is a view for explaining conventional processing for transmitting image data of a document.

PREFERRED EMBODIMENTS OF THE INVENTION

Figure 1:
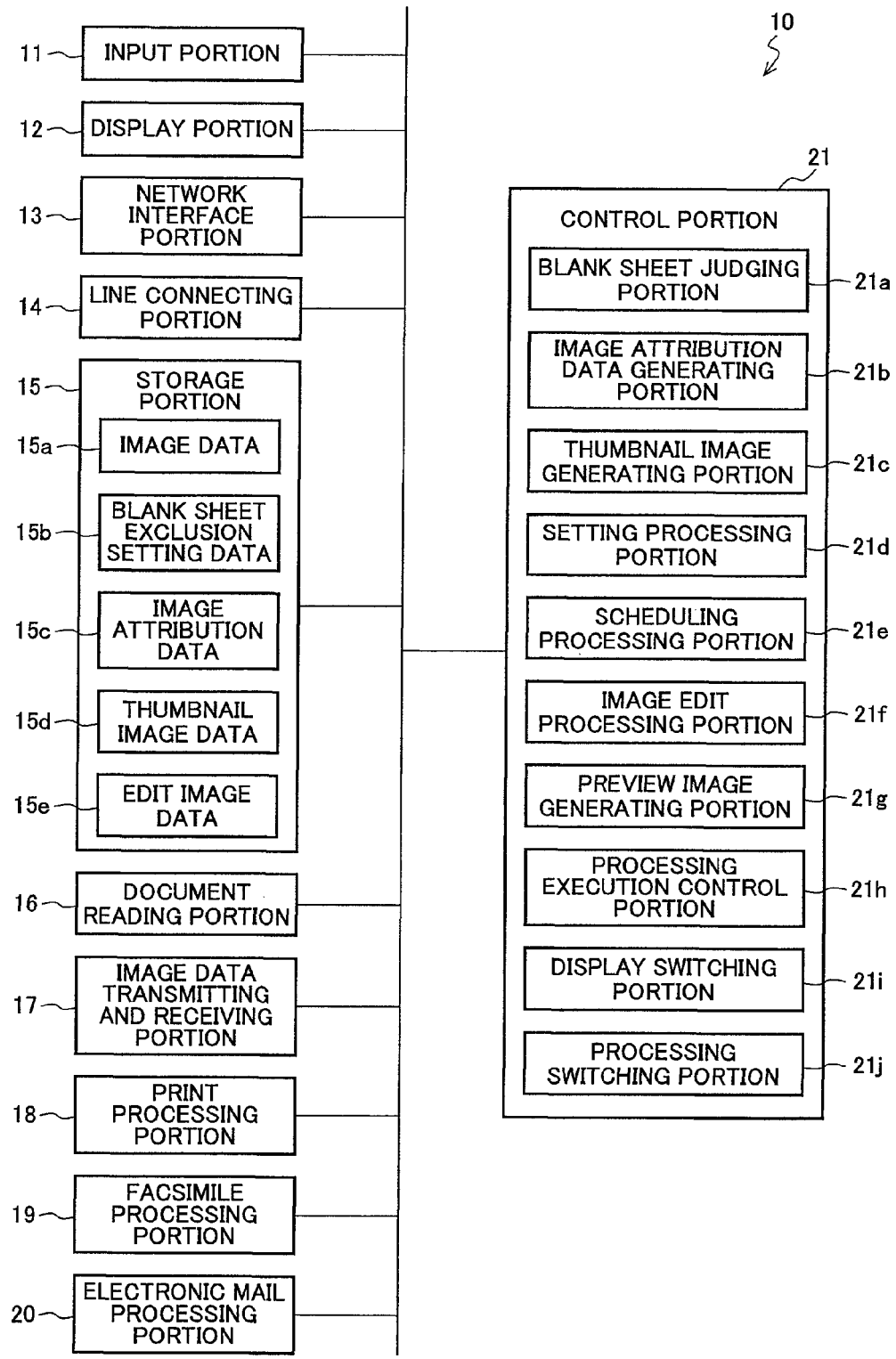
FIG. 1 is a functional block diagram of an image forming apparatus according to an embodiment of the present invention.

The embodiments of the present invention will hereinafter be described in detail with reference to the drawings. FIG. 1 is a functional block diagram of an image forming apparatus 10 according to an embodiment of the present invention. The image forming apparatus 10 is a multi-functional peripheral which executes various data processing realized by, for example, a scan function and a copy function for a document, a print function for image data, a facsimile transmission and reception function, an electronic mail transmission and reception function, a document filing function, and a network transmission and reception function.

The image forming apparatus 10 is provided with an input portion 11, a display portion 12, a network interface portion 13, a line connecting portion 14, a storage portion 15, a document reading portion 16, an image data transmitting and receiving portion 17, a print processing portion 18, a facsimile processing portion 19, an electronic mail processing portion 20, and a control portion 21.

The input portion 11 is an input device such as a key or a touch panel which receives input of various information from a user. The display portion 12 is a display device such as a liquid crystal display. The network interface portion 13 is a communication device which connects the image forming apparatus 10 to a network to transmit and receive data with an external device. The line connecting portion 14 is a communication device which connects the image forming apparatus 10 to a telephone line to transmit and receive data with an external device. The storage portion 15 is a storage device such as a memory or a hard disc device. The storage portion 15 stores image data 15a, blank sheet exclusion setting data 15b, image attribution data 15c, thumbnail image data 15d, and edit image data 15e.

The image data 15a is image data of a document read by the document reading portion 16, image data received by the image data transmitting and receiving portion 17 or the electronic mail processing portion 20 through the network from an external device, or image data received by the facsimile processing portion 19 through a telephone line from an external device.

The blank sheet exclusion setting data 15b is data which stores setting information of whether or not to exclude a blank page included in image data stored as the image data 15a (setting information of whether or not to perform so-called blank sheet skip) when the document reading portion 16, the image data transmitting and receiving portion 17, the print processing portion 18, the facsimile processing portion 19, or the electronic mail processing portion 20 performs document filing processing, network transmission processing, print processing, facsimile transmission processing, or electronic mail transmission processing, respectively. Note that, setting information of whether or not to exclude a blank page is stored for each destination (folder) having a file stored therein in the case of the document filing processing, and for each transmission destination in the case of the network transmission processing, the facsimile transmission processing, or the electronic mail transmission processing.

The image attribution data 15c is attribution data of an image indicating the number of pages included in each image data, whether or not a blank page is included in image data, and if a blank page is included in image data, on what page of the image data the blank page is included, or the like. The thumbnail image data 15d is data of a thumbnail image generated for each page of image data. The edit image data 15e is data of an image obtained as a result of scheduling processing or image edit processing which will be described below.

The document reading portion 16 is a processing portion which reads a document by scanning and stores data of the read document image as the image data 15a in the storage portion 15 temporarily or for a long period of time. The image data stored as the image data 15a is transmitted thorough the network, subjected to printing, transmitted by attaching to an electronic mail, transmitted by facsimile, or saved as electronic data directly (document filing).

The image data transmitting and receiving portion 17 is a processing portion which transmits and receives image data with an external device such as a personal computer through the network. The print processing portion 18 is a processing portion which performs print processing (copy processing) of image data read by the document reading portion 16 or print processing of image data received by the facsimile processing portion 19 or the electronic mail processing portion 20 from an external device.

The facsimile processing portion 19 is a processing portion which transmits and receives image data by facsimile with an external device such as a facsimile apparatus through the telephone line. The electronic mail processing portion 20 is a processing portion which transmits and receives image data by an electronic mail with an external device such as a personal computer thorough the network.

The control portion 21 is a processing portion which entirely controls the image forming apparatus 10 and is responsible for the transmission and reception of data between respective functional portions. The control portion 21 is constituted by, for example, a CPU (Central Processing Unit) or the like. The control portion 21 has a blank sheet judging portion 21a, an image attribution data generating portion 21b, a thumbnail image generating portion 21c, a setting processing portion 21d, a scheduling processing portion 21e, an image edit processing portion 21f, a preview image generating portion 21g, a processing execution control portion 21h, a display switching portion 21i, and a processing switching portion 21j.

The blank sheet judging portion 21a is a processing portion which judges whether or not each page of image data included in the image data 15a is a blank page. Specifically, the blank sheet judging portion 21a calculates a ratio of the number of pixels having a color other than white color to the total number of pixels for a page included in the image data, and when the ratio is not more than a predetermined value, judges the page as a blank page. In other cases, the blank sheet judging portion 21a does not judge the page as a blank page.

Moreover, the blank sheet judging portion 21a may judge whether or not a page is a blank page by removing an effect of an image printed on a back side of a sheet of paper (effect of back shadow). In this case, the blank sheet judging portion 21a extracts only pixels whose density value is larger than a predetermined value, calculates a ratio of the extracted pixel number to the total pixel number, and when the ratio is not more than the predetermined value, judges that the page is a blank page. In other cases, the blank sheet judging portion 21a does not judge the page as a blank page.

The image attribution data generating portion 21b is a processing portion which generates attribution data of image data. Specifically, the image attribution data generating portion 21b generates image attribution data indicating the number of pages included in image data, whether or not a blank page is included in image data, and if a blank page is included in image data, on what page of the image data the blank page is included, or the like, and stores the image attribution data thus generated as the image attribution data 15c in the storage portion 15.

The thumbnail image generating portion 21c is a processing portion which generates a thumbnail image of each page of image data including a blank page and stores the thumbnail image thus generated as the thumbnail image data 15d in the storage portion 15.

The setting processing portion 21d is a processing portion which receives input of various settings from the user through the input portion 11. For example, the setting processing portion 21d receives specification of data processing executed concurrently for image data of a document which has been scanned. The data processing includes document filing processing, network transmission processing, print processing, facsimile transmission processing, electronic mail transmission processing and the like. In addition, before executing the data processing and outputting image data, the setting processing portion 21d receives input of whether or not to perform preview display for confirming an output content of the image data.

Further, the setting processing portion 21d receives for each image data specification of whether or not to perform data processing with a blank page excluded for each data processing such as document filing processing, network transmission processing, print processing, facsimile transmission processing, or electronic mail transmission processing, which is performed for the image data from the user, and stores information of the specification thus received as the blank sheet exclusion setting data 15b in the storage portion 15.

Here, when the data processing is document filing processing, the setting processing portion 21d receives the specification of whether or not to perform the document filing processing with a blank page excluded for each destination folder in which image data of a document is filed. Moreover, when the data processing is network transmission processing, facsimile transmission processing or electronic mail transmission processing, the setting processing portion 21d receives the specification of whether or not to perform the document filing processing with a blank page excluded for each destination to which image data is transmitted.

In this manner, for each data processing such as document filing processing, network transmission processing, print processing, facsimile transmission processing, or electronic mail transmission processing which is executed by a function of the image forming apparatus 10, whether or not to regard a blank page as a target of data processing is set, thus making it possible for a user to appropriately execute each data processing in accordance with a use purpose of image data.

Moreover, by setting whether or not to regard a blank page as a target of data processing for each image data or transmission destination, in the case of image data or a transmission destination with high importance in which the image data or the transmission destination requires the transmission with even a blank page included, it is possible to transmit the image data with even a blank page included reliably. Further, if a blank page is deleted, when double-sided print is performed, etc., page arrangement is different from that of an original document, however, it is set such that a blank page is not excluded for a transmission destination with high importance, thus making it possible to maintain the page arrangement.

The scheduling processing portion 21e is a processing portion which executes scheduling processing for sorting each page of image data in an appropriate order. For example, when each sheet of paper is separated from a booklet which is made with a plurality of printed sheets of paper folded in the middle and each sheet of paper is scanned, the scheduling processing portion 21e sorts each page so that the arrangement order of each page of the booklet obtained by scanning is consistent with the order of the page number of the booklet. Moreover, when each page of image data is printed on sheets of paper and these sheets of paper are folded in the middle to make a booklet, the scheduling processing portion 21e sorts each page so that the arrangement order of each page of the booklet is consistent with the order of the page number of each page of the image data.

The image edit processing portion 21f is a processing portion which edits image data. For example, the image edit processing portion 21f performs processing for aggregating a plurality of pages of image data into one side of a sheet of paper or processing for enlarging or reducing an image.

The preview image generating portion 21g is a processing portion which generates data of a preview image which displays image data subjected to data processing before executing the data processing for image data. For example, the preview image generating portion 21g generates data of a document display preview screen which will be described below with reference to FIG. 2 or a finish display preview screen which will be described below with reference to FIG. 3.

The processing execution control portion 21h is a processing portion which controls the document reading portion 16, the image data transmitting and receiving portion 17, the print processing portion 18, the facsimile processing portion 19, or the electronic mail processing portion 20, and causes document filing processing, network transmission processing, print processing, facsimile transmission processing, or electronic mail transmission processing to be executed.

Specifically, when it is specified by the user to execute a plurality of data processing concurrently, the processing execution control portion 21h outputs signals to the document reading portion 16, the image data transmitting and receiving portion 17, the print processing portion 18, the facsimile processing portion 19, or the electronic mail processing portion 20 which executes the specified data processing, to cause concurrent executions of a plurality of data processing for image data with a blank page excluded or image data with a blank page included.

For example, when facsimile transmission processing and electronic mail transmission processing are specified by the user as data processing to be performed concurrently, the processing execution control portion 21h outputs signals to the facsimile processing portion 19 and the electronic mail processing portion 20 to cause concurrent executions of the facsimile transmission processing and the electronic mail transmission processing.

In addition, when facsimile transmission processing (multi-address transmission of facsimile), electronic mail transmission processing (multi-address transmission of an electronic mail) for a plurality of different transmission destinations, and the like are specified by the user as data processing to be performed concurrently, the processing execution control portion 21h outputs signals to the facsimile processing portion 19 and the electronic mail processing portion 20 to cause concurrent executions of the facsimile transmission processing and the electronic mail transmission to each transmission destination.

Figure 2:
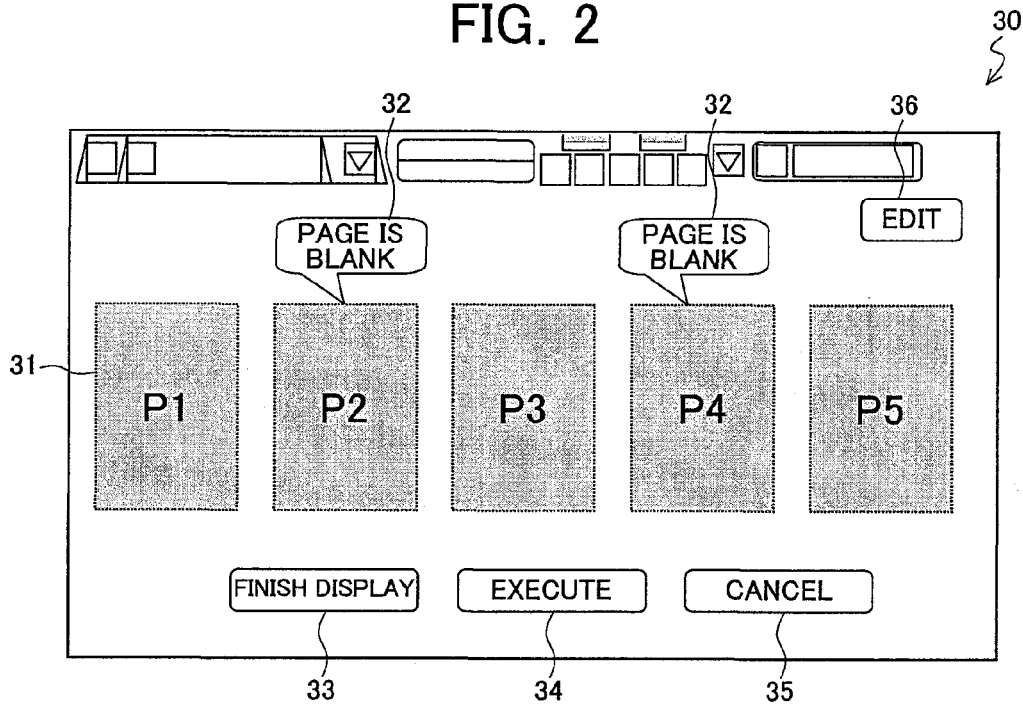
FIG. 2 is a view showing an example of a document display preview screen.
Figure 3:
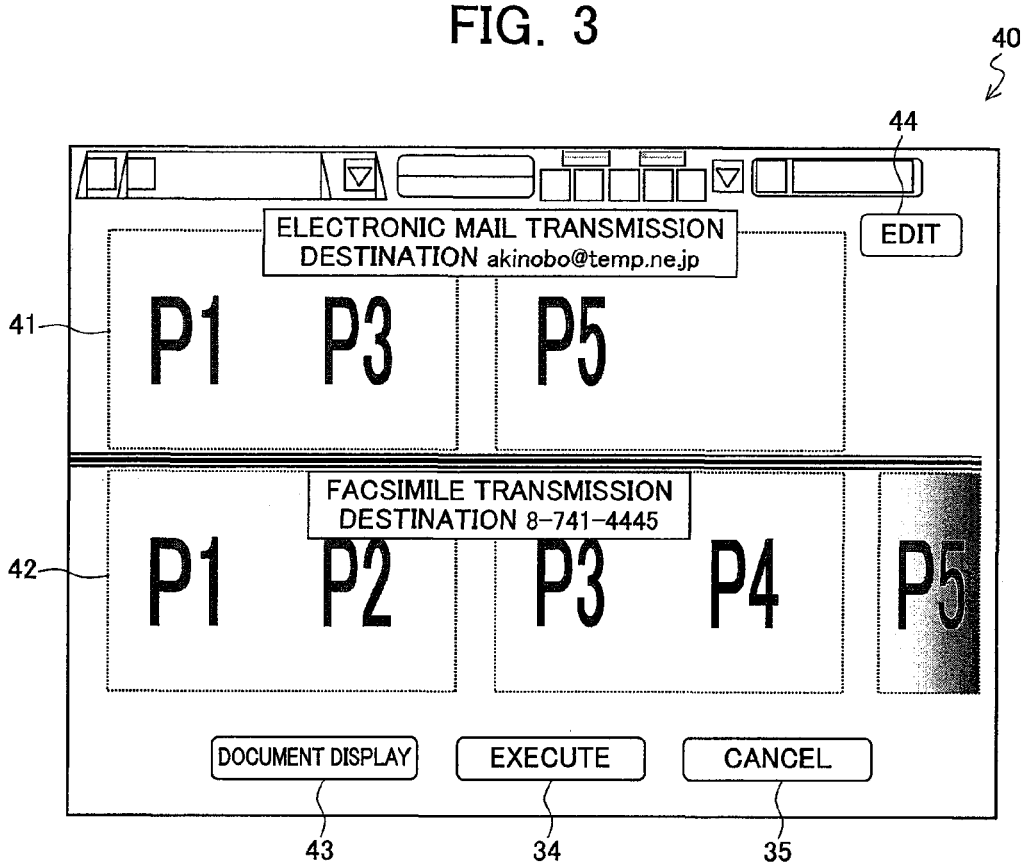
FIG. 3 is a view showing an example of a finish display preview screen.

The display switching portion 21i is a processing portion which switches a document display preview screen 30 shown in FIG. 2 and a finish display preview screen 40 shown in FIG. 3. FIG. 2 is a view showing an example of the document display preview screen 30, and FIG. 3 is a view showing an example of the finish display preview screen 40. Note that, on the finish display preview screen 40 in FIG. 3, image edit processing is performed for aggregating two pages of image data into one page.

The document display preview screen 30 is preview for displaying each page of image data stored in the storage portion 15 as the image data 15a with even a blank page included as it is. The finish display preview screen 40 is preview for displaying image data subjected to document filing, image data subjected to network transmission, image data subjected to printing, image data subjected to facsimile transmission, or image data subjected to electronic mail transmission in accordance with setting information stored in the storage portion 15 as the blank sheet exclusion setting data 15b with even a blank page included or with blank page excluded.

As illustrated in FIG. 2, on the document display preview screen 30, a thumbnail image 31 of each page of image data with even a blank page included is displayed. A message 32 of "Page is blank." is displayed for a blank page. Moreover, on the finish display preview screen 40, thumbnail images 41 and 42 of each page of image data with a blank page excluded or image data with even a blank page included are displayed concurrently for each data processing of image data.

For example, when it is set such that data processing is performed with a blank page excluded with respect to electronic mail transmission processing for a specific destination, the thumbnail image 41 of each page with a blank page excluded is displayed. In addition, when it is set such that data processing is performed with even a blank page included with respect to facsimile transmission processing for a specific destination, the thumbnail image 42 of each page with even a blank page included is displayed.

By performing such a display, it is possible for the user to confirm easily how a blank page is treated in a plurality of different data processing such as electronic mail transmission processing, and facsimile transmission processing.

Further, on the document display preview screen 30, a finish display instruction area 33, a processing execution start instruction area 34, a cancel instruction area 35, and an edit instruction area 36 are displayed. In addition, on the finish display preview screen 40, a document display instruction area 43, the processing execution start instruction area 34, the cancel instruction area 35, and an edit instruction area 44 are displayed.

The document display preview screen 30 and the finish display preview screen 40 are displayed on the display portion 12 which is arranged being overlaid on a touch panel, and when the thumbnail image 31, 41 or 42, the finish display instruction area 33, the processing execution start instruction area 34, the cancel instruction area 35, the edit instruction area 36 or 44, or the document display instruction area 43 is touched by the user, the touch is detected by the control portion 21, and various processing corresponding to the touched area is executed.

The finish display instruction area 33 on the document display preview screen 30 is an area for receiving an instruction from the user to switch the display from the document display preview screen 30 to the finish display preview screen 40. When the finish display instruction area 33 is touched by the user, the display switching portion 21*i* switches the display from the document display preview screen 30 to the finish display preview screen 40.

Moreover, the document display instruction area 43 on the finish display preview screen 40 is an area for receiving an instruction from the user to switch the display from the finish display preview screen 40 to the document display preview screen 30. When the document display instruction area 43 is touched by the user, the display switching portion 21*i* switches the display from the finish display preview screen 40 to the document display preview screen 30.

The processing execution start instruction areas 34 on the document display preview screen 30 and the finish display preview screen 40 are areas for receiving an instruction from the user to execute data processing of image data such as document filing processing, network transmission processing, print processing, facsimile transmission processing, or electronic mail transmission processing.

When the processing execution start instruction area 34 is touched by the user, the processing execution control portion 21*h* controls to execute data processing such as document filing processing, network transmission processing, print processing, facsimile transmission processing, or electronic mail transmission processing which is specified by the user.

The cancel instruction areas 35 on the document display preview screen 30 and the finish display preview screen 40 are areas for receiving an instruction from the user to cancel execution of data processing. When the cancel instruction area 35 is touched by the user, the processing execution control portion 21*h* cancels the data processing specified by the user.

The edit instruction areas 36 and 44 on the document display preview screen 30 and the finish display preview screen 40 are areas for receiving an instruction by the user to edit image data subjected to data processing. By touching the edit instruction areas 36 and 44, the user is able to include a blank page which has been excluded from a target of data processing in the target or to exclude a page of image data which has been included in a target of data processing from the target.

For example, when the edit instruction area 44 is touched by the user on the finish display preview screen 40 shown in FIG. 3, a selection screen (not shown) for causing the user to select whether to add a page to image data to be processed or exclude a page from image data to be processed is displayed. Moreover, when the edit instruction area 36 is touched by the user on the document display preview screen 30 shown in FIG. 2, the above described selection screen is also displayed while the display is switched to the finish display preview screen 40.

When the exclusion of a page is selected by the user on the selection screen and a thumbnail image of a page which is desirably excluded is touched by the user from among the thumbnails 41 and 42 of image data on the finish display preview screen 40, the page is excluded from a target of data processing. Then, the finish display preview screen 40 including a thumbnail image of each page from which the touched page is excluded is displayed again.

Moreover, when the addition of a page is selected by the user on the above described selection screen and the thumbnail image 41 of image data to which a page is desirably added is touched by the user, the document display preview screen 30 shown in FIG. 2 is displayed. When the thumbnail image of the page which is desirably added is touched by the user on the document display preview screen 30, then the page is added to the image data. Thereafter, the finish display preview screen 40 including the thumbnail image of the image data to which the page is added is displayed again.

Note that, in this example, though the thumbnail image 41 of image data to which a blank page is desirably added on the finish display preview screen 40 and the thumbnail image 31 of image data on the document display preview screen 30 are displayed on separate screens at the time of adding a blank page, it may be configured such that, when the thumbnail image 41 of image data to which a page is desirably added is touched by the user, the images are displayed on one screen so that the user is able to confirm both images easily.

Further, though a page to be excluded from image data or a page to be added to image data has been specified by the user for each page here, it may be configured such that, when a page to be excluded or a page to be added is a blank page, a blank page to be excluded from the image data or a blank page to be added to the image data is specified by the user collectively.

In this case, for example, when the edit instruction area 44 is touched by the user on the finish display preview screen 40 shown in FIG. 3, a selection screen (not shown) for causing the user to select whether to add a blank page to image data to be processed or exclude a blank page from image data to be processed is displayed. Moreover, when the edit instruction area 36 is touched by the user on the document display preview screen 30 shown in FIG. 2, the display is switched to the finish display preview screen 40 and the above described selection screen is displayed.

When the exclusion of a blank page is selected by the user and the thumbnail image 42 of a page of image data which includes a blank page is touched by the user from among the thumbnails 41 and 42 of each page of image data, blank pages included in the image data corresponding to the thumbnail image 42 are excluded from the target of data processing collectively. Then, the finish display preview screen 40 including a thumbnail image of each page from which the blank pages are excluded is displayed again.

Moreover, when the addition of a blank page is selected by the user on the above described selection screen and the thumbnail image 41 of image data which does not include a blank page is selected by the user from among the thumbnail images 41 and 42 of each page of image data, blank pages are added to the image data corresponding to the thumbnail image 41 collectively. Then, the finish display preview screen 40 including a thumbnail image of each page to which the blank pages are added is displayed again.

In this manner, by displaying the finish display preview screen 40, in the case of image data or a transmission destination with high importance in which image data or a transmission destination requires transmission with even a blank page included, it is possible to confirm if image data with even a blank page included is transmitted and to prevent transmission omitting of a blank page. Moreover, by switching the display between the document display preview screen 30 and the finish display preview screen 40, the user becomes possible to compare an original configuration of each of page of image data and a final configuration of each page of image data subjected to data processing easily. Further, by displaying a thumbnail of each page of image data, visibility is improved.

Returning to the description of FIG. 1, the processing switching portion 21j is a processing portion which switches document filing processing, network transmission processing, print processing, facsimile transmission processing, or electronic mail transmission processing, which has been selected by the user once, to other data processing.

Specifically, when receiving an instruction to switch data processing to be executed from the user through the input portion 11, the processing switching portion 21j cancels data processing which has been already specified to be executed by the user as well as gives an instruction to the setting processing portion 21d to newly receive specification of data processing to be desirably executed. The setting processing portion 21d which has received the instruction receives specification of data processing to be desirably executed from the user through the input portion 11. This allows the user to do selection of data processing again at all times.

Next, an example of image data processing according to the present embodiment will be described. Image data processing described below is constituted by image data reading processing for scanning a document image to read image data and data processing which is performed concurrently for the read image data (for example, document filing processing, network transmission processing, print processing, facsimile transmission processing, or electronic mail transmission (Scan To Email) processing).

Figure 4:
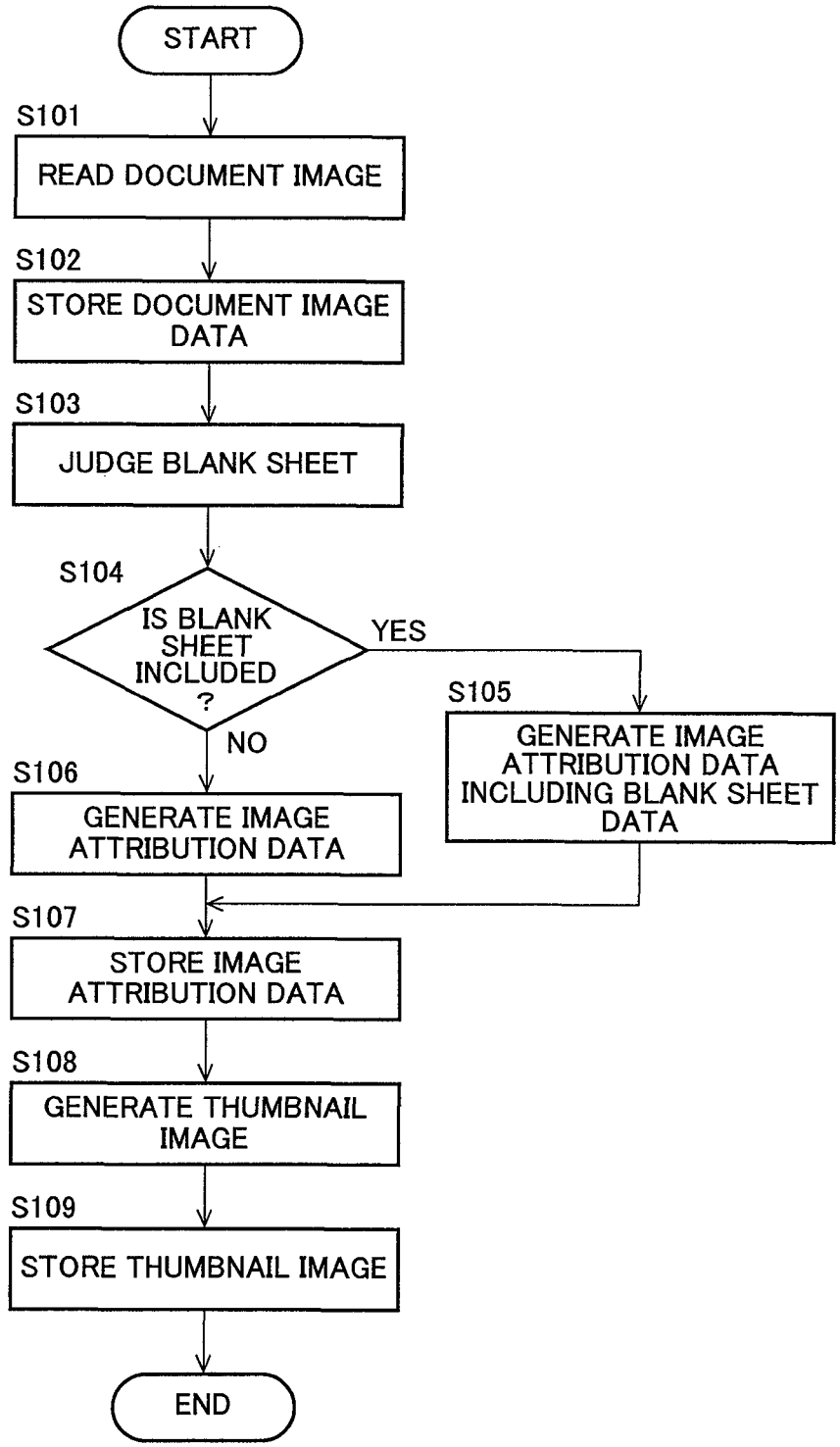
FIG. 4 is a view for explaining an example of image data reading processing according to the present embodiment.

First, image data reading processing according to the present embodiment will be described. FIG. 4 is a view for explaining an example of image data reading processing according to the present embodiment. As shown in FIG. 4, first, the document reading portion 16 of the image forming apparatus 10 reads a document by scanning (step S101), and stores image data of the document which is read as the image data 15a in the storage portion 15 (step S102).

Then, the blank sheet judging portion 21a judges whether or not a blank page is included in each page of the stored image data (step S103). When a blank page is included in each page of the image data (in the case of YES at step S104), the image attribution data generating portion 21b generates image attribution data including information about a blank page, such as a page number of a blank page included in the image data (step S105). When a blank page is not included in each page of the image data (in the case of NO at step S104), the image attribution data generating portion 21b generates image attribution data including information indicating that a blank page is not included in the image data (step S106).

The image attribution data generating portion 21b then stores the image attribution data generated at step S105 or at step S106 as the image attribution data 15c in the storage portion 15 (step S107).

Subsequently, the thumbnail image generating portion 21c generates a thumbnail image of each page of the image data included in the image data 15a (step S108). The thumbnail image generating portion 21c then stores the thumbnail image thus generated as the thumbnail image data 15d in the storage portion 15 (step S109), and the image data reading processing is finished.

Figure 5:
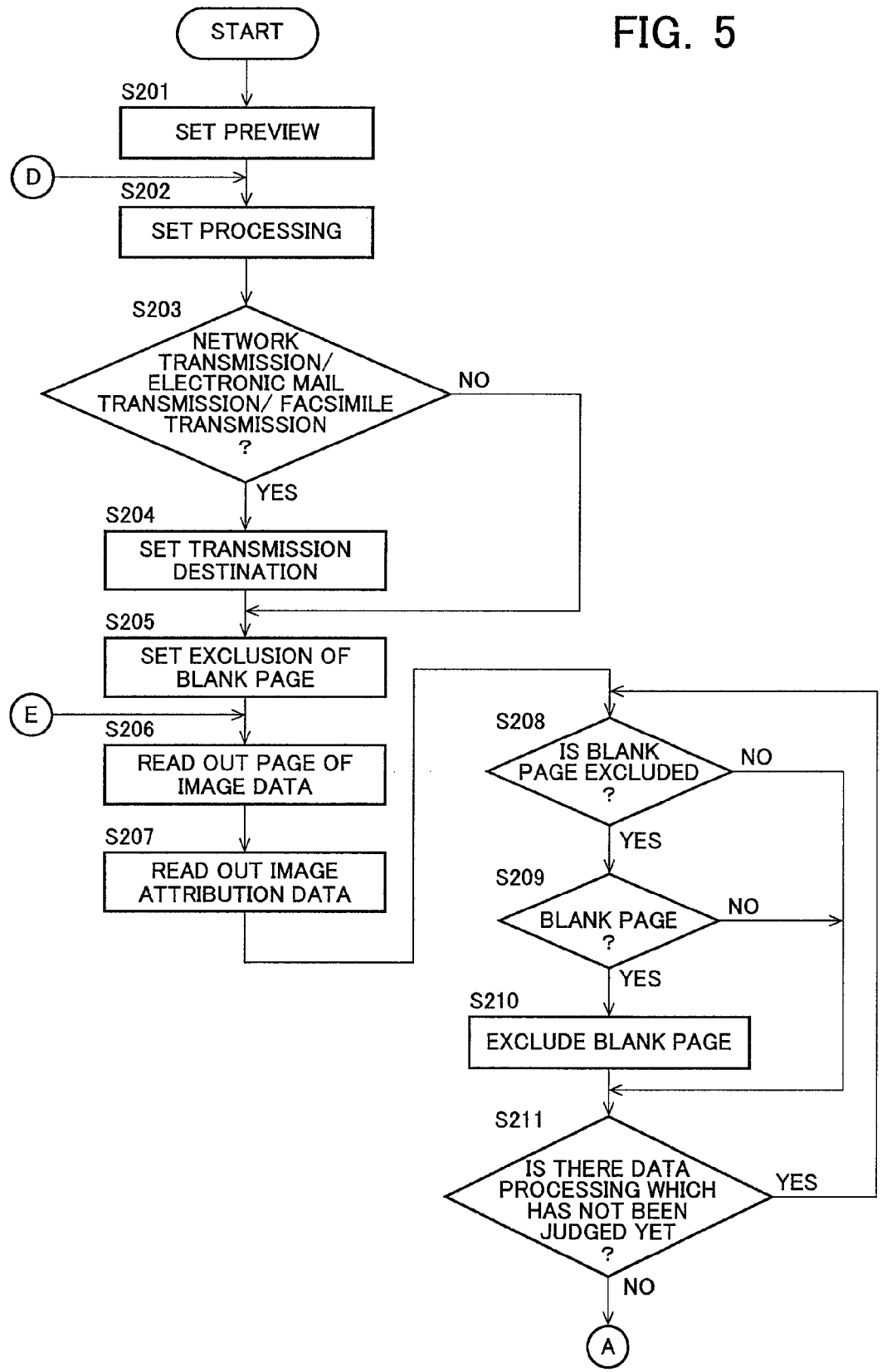
FIG. 5 is a view for explaining an example of processing procedure of data processing of image data according to the present embodiment.
Figure 6:
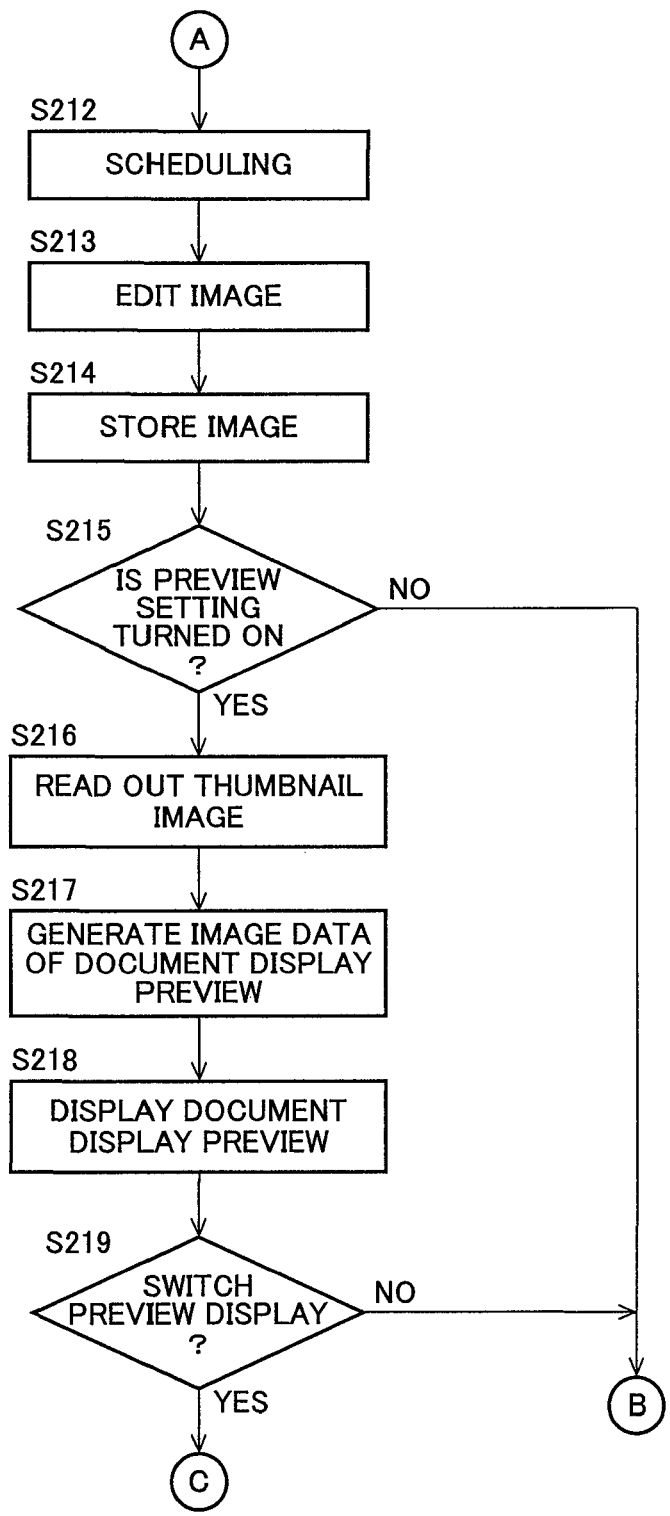
FIG. 6 is a view for explaining an example of processing procedure of data processing of image data according to the present embodiment.
Figure 7:
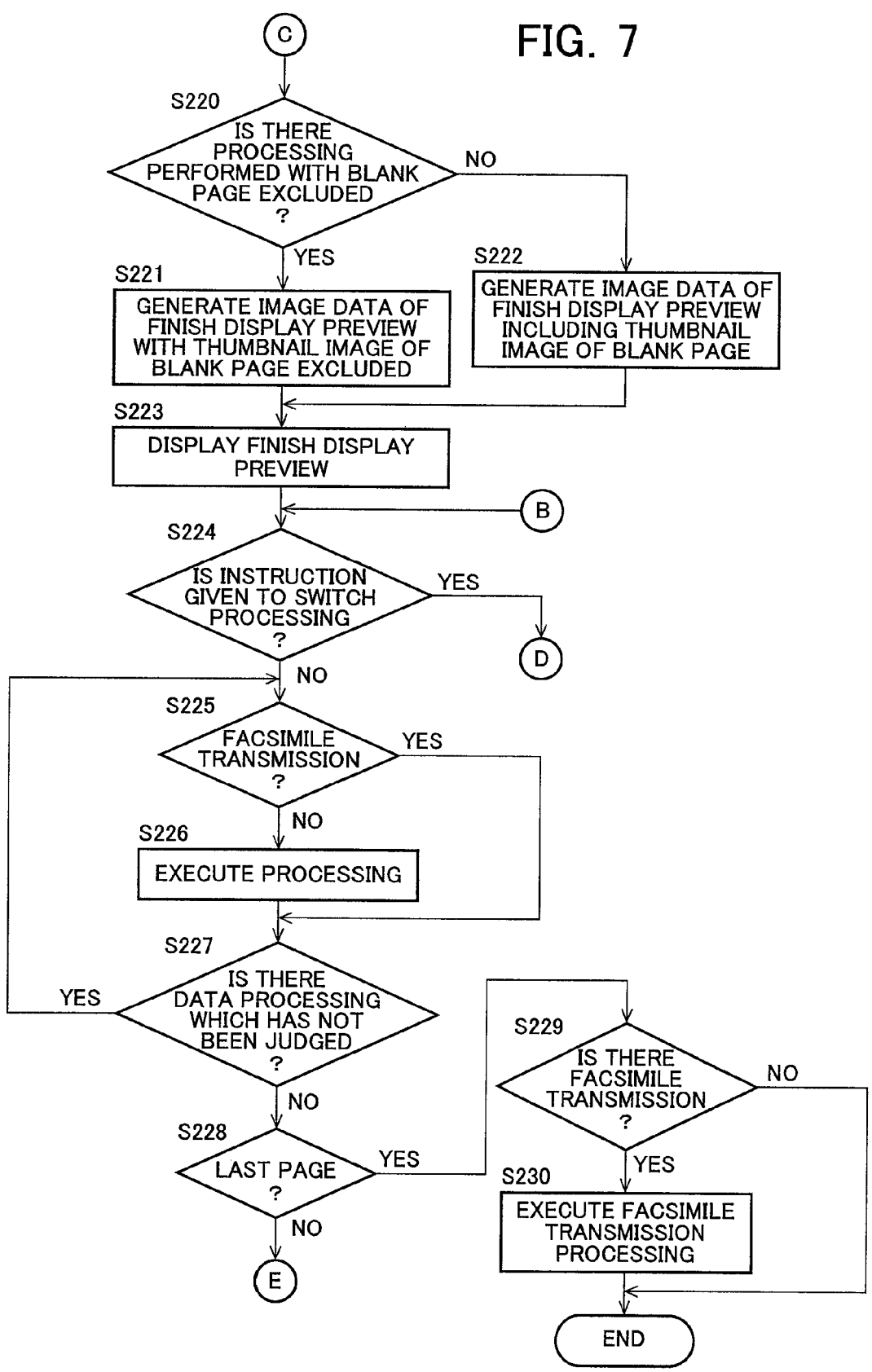
FIG. 7 is a view for explaining an example of processing procedure of data processing of image data according to the present embodiment.

Next, data processing of image data according to the present embodiment will be described. FIGS. 5 to 7 are views for explaining an example of processing procedure of data processing of image data according to the present embodiment. Moreover, FIGS. 8 to 13 are exemplary screens displayed on the display portion 12 in data processing of image data.

As shown in FIG. 5, first, the setting processing portion 21d of the image forming apparatus 10 receives input of whether or not to perform preview display from the user through the input portion 11 (step S201). Further, the setting processing portion 21d receives specification of data processing performed for image data of a scanned document (for example, document filing processing, network transmission processing, print processing, electronic mail transmission processing, or facsimile transmission processing) from the user through the input portion 11 and sets the specified data processing as processing to be executed (step S202).

FIG. 8 shows an example of a data processing reception screen 50 for receiving specification of data processing. On the data processing reception screen 50, a print processing instruction area 51 for receiving specification of print processing (copy processing), an electronic mail transmission processing instruction area 52 for receiving specification of electronic mail transmission processing, a facsimile transmission processing instruction area 53 for receiving specification of facsimile transmission processing, a document filing processing instruction area 54 for receiving specification of document filing processing, and a network transmission processing instruction area 55 for receiving specification of network transmission processing are displayed. When any of these areas is touched by the user, the setting processing portion 21d judges that data processing corresponding to the touched area is data processing which is specified by the user to be executed. Note that, when the user tries to execute a plurality of data processing concurrently, the user touches a plurality of areas corresponding to each data processing on the data processing reception screen 50.

Returning to the description of FIG. 5, after the processing of step S202, the processing execution control portion 21h judges whether or not the data processing specified by the user includes network transmission processing, electronic mail transmission processing, or facsimile transmission processing (step S203). When the data processing includes network transmission processing, electronic mail transmission processing, or facsimile transmission processing (in the case of YES at step S203), then the processing execution control portion 21h receives information of a transmission destination for network transmission processing, electronic mail transmission processing, or facsimile transmission processing from the user through the input portion 11, and sets the transmission destination using the information (step S204).

FIG. 8 shows an electronic mail transmission processing setting screen 60 which is displayed when electronic mail transmission processing is specified by the user on the data processing reception screen 50. On the electronic mail transmission processing setting screen 60, an address book display instruction area 61 is displayed, and when the address book display instruction area 61 is touched by the user, an address book display screen 70 is displayed as shown in FIG. 9.

Further, when one of destinations which are registered is touched by the user on the address book display screen 70, a destination detail display screen 80 indicating detail information of the destination is displayed. When an electronic mail address is touched by the user on the destination detail display screen 80, then a destination of an electronic mail is set to the electronic mail address which is touched. Moreover, when a telephone number is touched by the user on the destination detail display screen 80, then a destination of facsimile transmission is set to the telephone number which is touched.

In addition, when a name of an external device such as a personal computer is touched by the user on the address book display screen 70 shown in FIG. 9, detail information similar to that of the destination detail display screen 80 is displayed, and when an address of the external device is touched by the user, a destination of network transmission is set to the address which is touched.

Here, the user is able to set one or more destinations for each of network transmission processing, electronic mail transmission processing, or facsimile transmission processing to be executed through the address book display screen 70 shown in FIG. 9. When a destination is set, the display is switched again to the electronic mail transmission processing setting screen 60 as shown in FIG. 10.

Returning to the description of FIG. 5, after the processing of step S204 is executed or when the data processing does not include network transmission processing, electronic mail transmission processing, or facsimile transmission processing at step S203 (in the case of NO at step S203), the setting processing portion 21d receives specification of whether or not to perform the data processing with a blank page excluded through the input portion 11 and sets whether or not to perform processing for excluding a blank page based on the specification (step S205).

Figure 11:
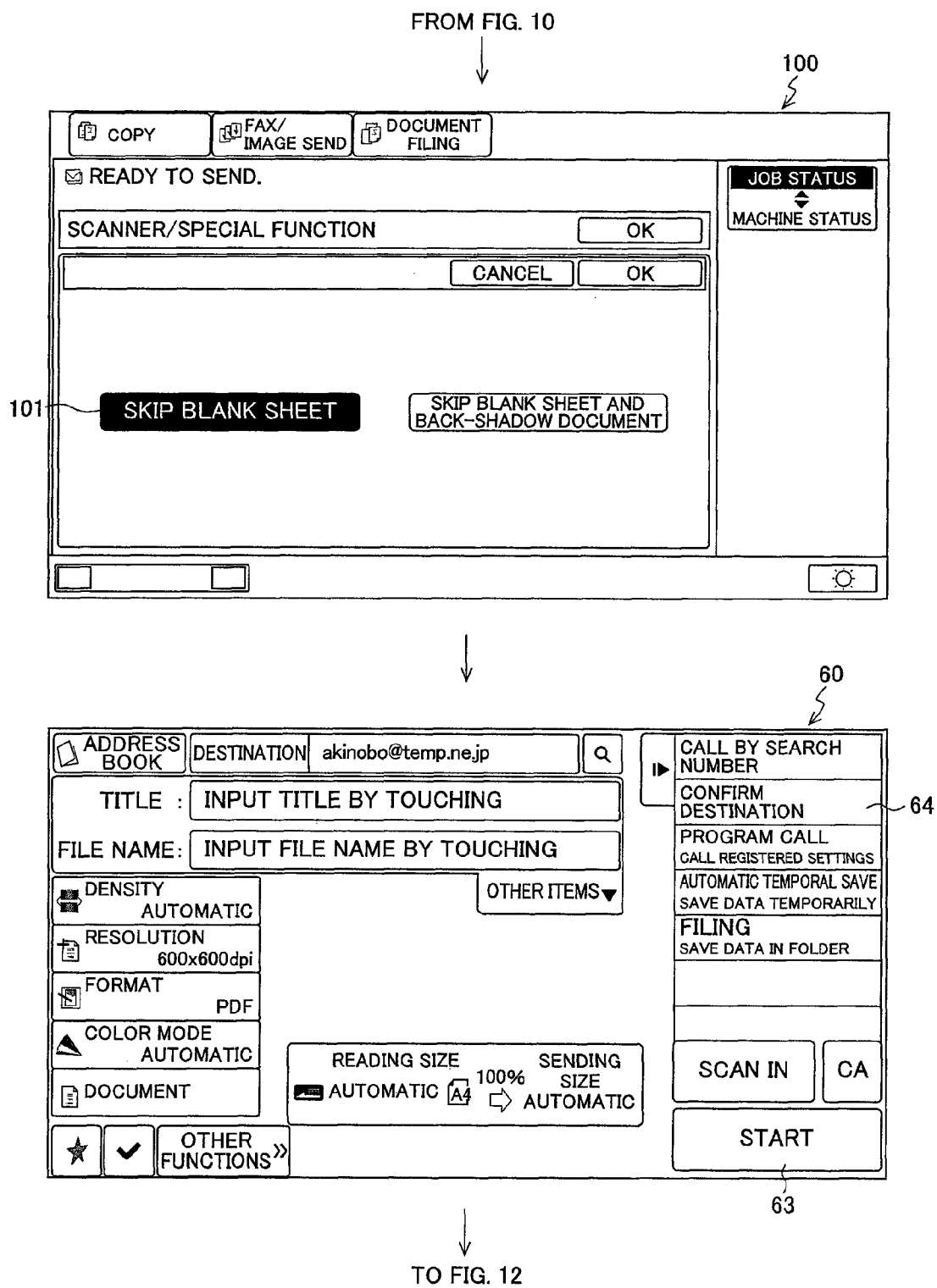
FIG. 11 is an exemplary screen displayed on the display portion in data processing of image data.

FIG. 11 shows a blank page exclusion instruction reception screen 100 for receiving specification of whether or not to perform processing for excluding a blank page in electronic mail transmission processing from the user. The blank page exclusion instruction reception screen 100 is a screen which is displayed when a blank page exclusion function selection area 91 for displaying the blank page exclusion instruction reception screen 100 is touched by the user on the function display screen 90 shown in FIG. 10. Moreover, the function display screen 90 is a screen which is displayed when a function selection area 62 is touched by the user on the electronic mail transmission setting screen 60.

On the blank page exclusion specification reception screen 100, a blank page exclusion instruction area 101 for instructing to perform processing for excluding a blank page is displayed, and when the blank page exclusion instruction area 101 is touched by the user, the setting processing portion 21d judges that an instruction to exclude a blank page has been received from the user.

Note that, when the specification to perform processing for excluding a blank page is received from the user, the blank sheet exclusion setting data 15b stored in the storage portion 15 is read out and data processing with a blank page excluded is performed in data processing which is set as data processing performed with a blank page excluded to the blank sheet exclusion setting data 15b. Here, when there is no data processing which is set as data processing which is performed with a blank page excluded to the blank sheet exclusion setting data 15b, even if the blank page exclusion instruction area 101 is touched by the user and the specification to perform processing for excluding a blank page is received from the user, the data processing is not performed with a blank page excluded.

Returning to the description of FIG. 5, after step S205, the scheduling processing portion 21e reads out one page of image data stored as the image data 15a in the storage portion 15 as a page to be processed (step S206). Further, the scheduling processing portion 21e reads out the image attribution data 15c from the storage portion 15 and acquires information of whether or not the above described image data is a blank page and the like (step S207).

The scheduling processing portion 21e then judges whether or not one of data processing among respective data processing performed concurrently is data processing which is performed with a blank page excluded (step S208). Specifically, when the specification to exclude a blank page is received from the user at step S205 and when the data processing is set in advance as data processing for performing processing for excluding a blank page to the blank sheet exclusion setting data 15b, the scheduling processing portion 21e judges that the data processing is data processing which is performed with a blank page excluded. In other cases, the scheduling processing portion 21e judges that the data processing is not data processing which is performed with a blank page excluded.

When the data processing is data processing for performing processing for excluding a blank page at step S208 (in the case of YES at step S208), the scheduling processing portion 21e then judges whether or not a page to be processed is a blank page at step S209 (step S209). When the page to be processed is a blank page (in the case of YES at step S209), then the scheduling processing portion 21e excludes the blank page to be processed from the image data (step S210).

Thereafter, the scheduling processing portion 21e judges whether or not there is data processing which has not been a target of the judgment processing of step S208 among a plurality of data processing specified to be performed concurrently by the user (step S211). Alternatively, when the data processing is not data processing for performing processing for excluding a blank page (in the case of NO at step S208), or when a page to be processed is not a blank page (in the case of NO at step S209), the scheduling processing portion 21e also executes the processing of step S211. When there is data processing which has not been a target of the judgment processing of step S208 (in the case of YES at step S211), then the procedure moves to step S208 and subsequent processing is executed for the data processing.

When there is no data processing which has not been a target of the judgment processing of step S208 (in the case of NO at step S211), as shown in FIG. 6, the scheduling processing portion 21e executes scheduling processing for sorting the order of each page of the image data which has been read out so far (step S212). However, when the arrangement order of each page is correct, the scheduling processing is not performed.

Thereafter, the image edit processing portion 21f executes image edit processing for aggregating each page of the image data which has been read out so far into a single side of a sheet of paper, or enlarging or reducing an image included in each page (step S213). However, when the edit of an image is not necessary, the image edit processing is not performed. The image edit processing portion 21f then stores image data edited by the image edit processing and stores unedited image data when the image edit processing is not performed as the edit image data 15e in the storage portion 15 (step S214).

Thereafter, the preview image generating portion 21g judges whether or not an instruction to execute preview display is given by the user at step S201 of FIG. 5 (step S215). When it is instructed by the user to execute the preview display (in the case of YES at step S215), the preview image generating portion 21g reads out a thumbnail image which is stored as the thumbnail image data 15d in the storage portion 15 (step S216).

Subsequently, the preview image generating portion 21*g* generates image data of the document display preview screen 30, an example of which is displayed in FIG. 2, using the read thumbnail image (step S217). The preview image generating portion 21*g* then displays the document display preview screen 30 on the display portion 12 using the generated data (step S218).

Thereafter, the display switching portion 21*i* judges whether or not an instruction to switch the display from the document display preview screen 30 to the finish display preview screen 40, an example of which is displayed in FIG. 3, is received from the user (step S219). The display switching portion 21*i* carries out the above described judgment, for example, by detecting whether or not the finish display instruction area 33 of FIG. 2 is touched by the user.

When the instruction to switch the display is received from the user (in the case of YES at step S219), as shown in FIG. 7, it is searched whether or not there is processing which is performed with a blank page excluded in the data processing to be executed (step S220). When there is processing which is performed with a blank page excluded in the data processing to be executed (in the case of YES at step S220), the preview image generating portion 21*g* generates image data of the finish display preview screen 40 with a thumbnail image of a blank page excluded for the data processing which is performed with a blank page excluded (step S221). The display portion 12 then displays the finish display preview screen 40 thus generated (step S223).

When there is no processing which is performed with a blank page excluded in the data processing to be executed at step S220 (in the case of NO at step S220), the preview image generating portion 21*g* generates image data of the finish display preview screen 40 including a thumbnail image of a blank page for all data processing (step S222). The display portion 12 then displays the finish display preview screen 40 thus generated (step S223).

Thereafter, the processing switching portion 21*j* judges whether or not an instruction to switch the data processing to be executed (document filing processing, network transmission processing, print processing, electronic mail transmission processing, or facsimile transmission processing) is received from the user through the input portion 11 (step S224).

Alternatively, when it is not instructed by the user to execute the preview display at step S215 of FIG. 6 (in the case of NO at step S215), or when the instruction to switch the preview display is not received from the user at step S219 (in the case of NO at step S219), the judgment processing of step S224 is also executed.

When the instruction to switch the data processing to be executed is received from the user (in the case of YES at step S224), the procedure moves to step S202 of FIG. 5, and the setting processing portion 21*d* receives the specification of data processing which is desirably executed from the user through the input portion 11 (step S202) and subsequent processing is executed.

In this case, image data of the finish display preview screen 40 including a thumbnail image of the data processing which is newly specified by the user is generated and the finish display preview screen 40 is displayed. This allows the user to do selection of data processing again at all times and to confirm a final configuration of each page of image data subjected to data easily.

When the instruction to switch the data processing to be executed is not received from the user at step S224 of FIG. 7 (in the case of NO at step S224), the processing execution control portion 21*h* judges whether or not the data processing to be executed is facsimile transmission processing (step S225).

When the data processing to be executed is not facsimile transmission processing (in the case of NO at step S225), the processing execution control portion 21*h* transmits image data to a processing portion which executes each data processing such as document filing processing, image data transmission processing, print processing, or electronic mail transmission processing, and the processing portion which has received the image data executes data processing for one page of the image data with even a blank page included or data processing for one page of the image data with a blank page excluded corresponding to setting information stored as the blank sheet exclusion setting data 15*b* in the storage portion 15 (step S226).

However, the data processing is executed when the execution of the data processing is instructed by the user. For example, FIG. 11 shows the electronic mail transmission processing setting screen 60 which is displayed again after the user has instructed to perform processing for excluding a blank page on the blank page exclusion processing setting screen 100 (the blank page exclusion processing setting screen 100 shown in FIG. 11) displayed in the processing of step S205 of FIG. 5. In the case where the processing execution start instruction area 63 is touched by the user on the electronic mail transmission processing setting screen 60 or the like, the execution of the processing of step S226 and step S230 which will be described below is started.

Figure 12:
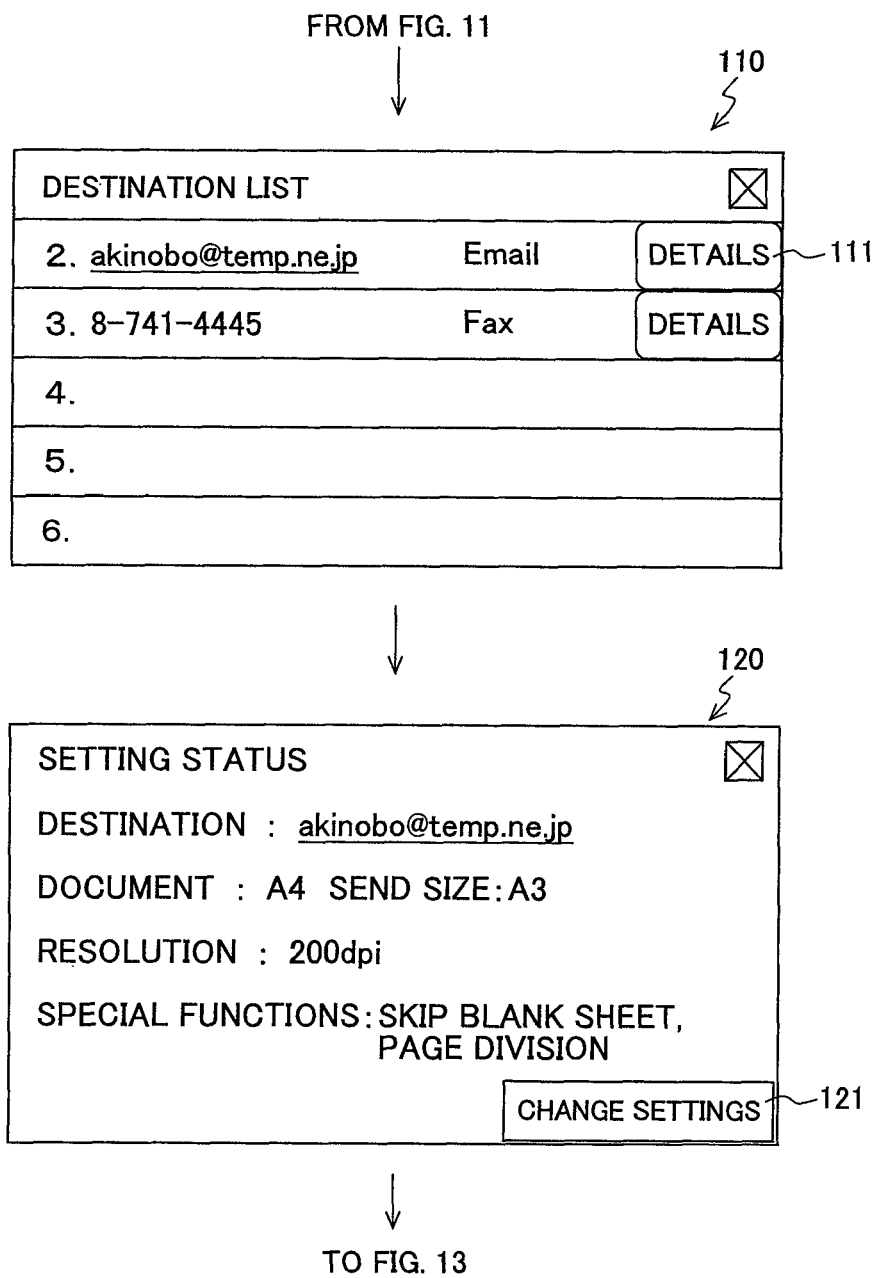
FIG. 12 is an exemplary screen displayed on the display portion in data processing of image data.

Moreover, when a destination confirmation area 64 is touched by the user on the electronic mail transmission processing setting screen 60, as shown in FIG. 12, a destination list screen 110 is displayed on the display portion 12. In this example, since electronic mail transmission processing and facsimile transmission processing are selected as data processing executed concurrently, a transmission destination of an electronic mail and a transmission destination of a facsimile are displayed on the destination list screen 110.

Further, when a detail display instruction area 111 which is displayed for each destination on the destination list screen 110 is touched by the user, a setting detail display screen 120 which displays details of settings of the destination corresponding to the touched detail display instruction area 111 is displayed on the display portion 12. When a setting change instruction area 121 which is displayed on the setting detail display screen 120 is touched by the user, the display is switched to the electronic mail transmission processing setting screen 60, thus allowing the change of the destination and the like. Note that, in each function of electronic mail transmission, facsimile transmission, or the like, information of whether or not to exclude a blank page is set in advance for each function or for each destination, and the setting information is stored as the blank sheet exclusion setting data 15*b* in the storage portion 15. The information is displayed in a field of a special function of the setting detail display screen 120.

Moreover, the processing execution control portion 21*h* may set a resolution for each function of mail transmission, facsimile transmission, or the like, or for each destination. In this case, the storage portion 15 stores information of the resolution in advance being corresponding to each function and each destination, and the processing execution control portion 21*h* reads out the information and sets the resolution of the image data subjected to data processing. Then, the information is displayed in a field of a resolution of the setting detail display screen 120. When the resolution is set by the processing execution control portion 21h, each data processing is to be executed with the resolution.

Figure 13:
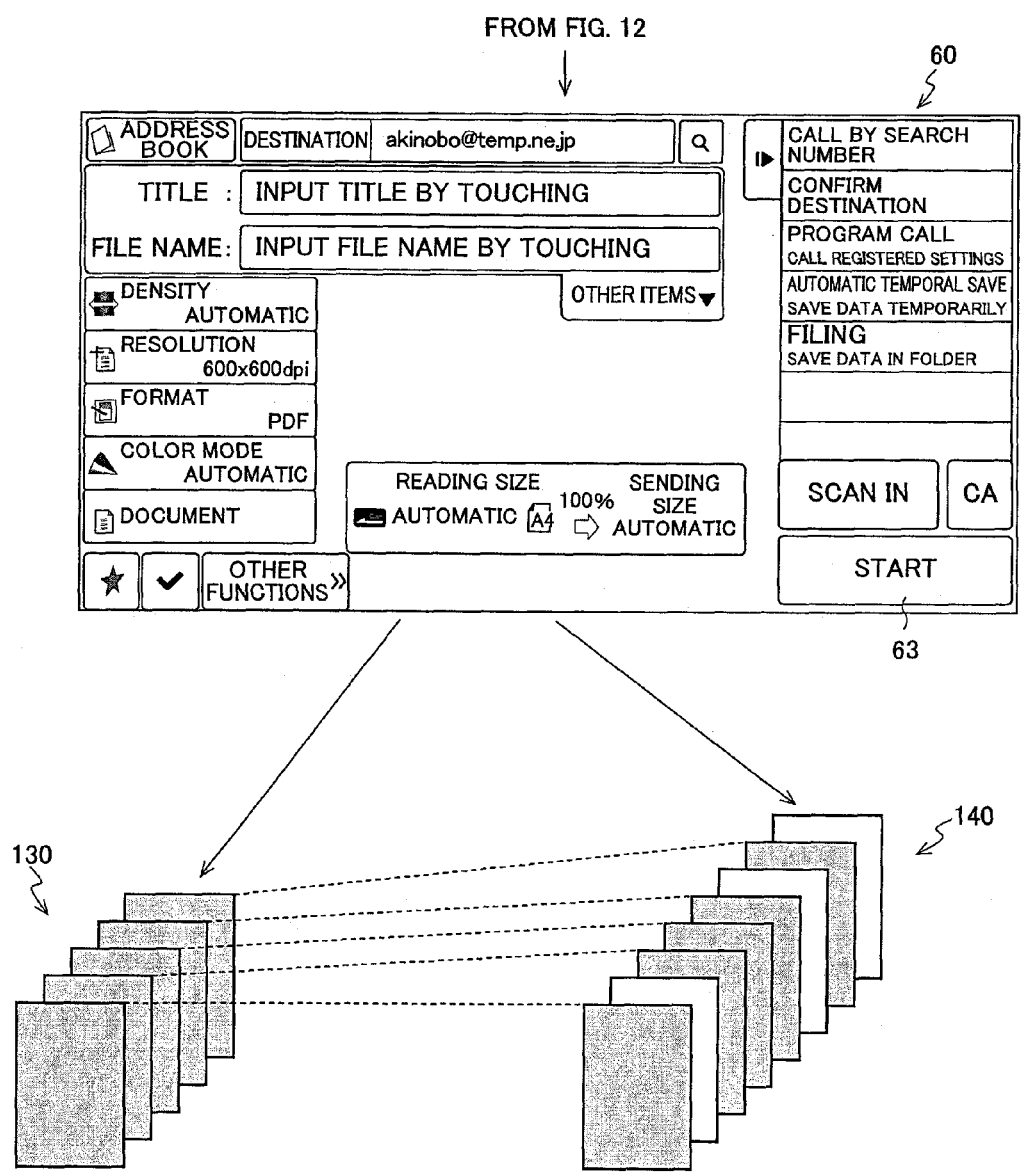
FIG. 13 is an exemplary screen displayed on the display portion in data processing of image data.

When the destination list screen 110 or the destination detail display screen 120 is closed, as shown in FIG. 13, the display is switched again to the electronic mail transmission processing setting screen 60, and when the processing execution start instruction area 63 is touched by the user, the execution of the processing of step S226 and step S230 which will be described below is started. In other words, whether the data processing to be executed is data processing which is performed with a blank page excluded or data processing which is performed with even a blank page included is judged based on information stored as the blank sheet exclusion setting data 15b, and depending on the judgment result, the data processing is executed for image data 130 with a blank page excluded or image data 140 including a blank page.

Moreover, when the processing execution start instruction area 34 is touched by the user on the document display preview screen 30 (the document display preview screen 30 shown in FIG. 2) which is displayed at step S218 of FIG. 6, and also when the processing execution start instruction area 34 is touched by the user on the finish display preview screen 40 (the finish display preview screen 40 shown in FIG. 3) which is displayed at step S223 of FIG. 7, the execution of the processing of step S226 and step S230 which will be described below is started.

Note that, when image edit processing is performed to aggregate a plurality of pages into one page at step S213 of FIG. 6, until one page of the image data in which a plurality of pages are aggregated is generated, the data processing for the page read out at step S206 of FIG. 5 is not executed. Moreover, also when the blank page read out at step S206 of FIG. 5 is excluded at step S210 of FIG. 5, the data processing is not performed with a blank page excluded for the excluded blank page. In addition, in facsimile transmission processing, at a stage where all pages of the image data are provided (step S230 which will be described below), the transmission processing is performed.

Moreover, when an instruction to execute data processing is not input yet at the time when the processing of step S226 is executed, the processing may be interrupted until the input is performed or the processing subsequent to step S227 may be performed and the data processing may be executed at the time when the input is performed by the user.

After the processing of step S226, or when the data processing to be executed is facsimile transmission processing at step S225 (in the case of YES at step S225), the processing execution control portion 21h judges whether or not there is data processing which has not been a target of the judgment processing of step S225 yet (step S227). When there is data processing which has not been a target of the above described judgment processing (in the case of YES at step S227), the procedure moves to step S225 and subsequent processing is executed for the data processing which has not been a target of the above described judgment processing.

When there is no data processing which has not been a target of the judgment processing of step S225 at step S227 (in the case of NO at step S227), the processing execution control portion 21h judges whether or not the page read out at step S206 of FIG. 5 is the last page of the image data (step S228). When the page is not the last page of the image data (in the case of NO at step S228), the procedure moves to step S206 shown in FIG. 5, and the scheduling processing portion 21e reads out one page next to the page (step S206). Thereafter, subsequent processing is executed.

When the page read out at step S206 of FIG. 5 is the last page of the image data (in the case of YES at step S228), the processing execution control portion 21h judges whether or not facsimile transmission processing is included in data processing executed concurrently (step S229). When facsimile transmission processing is included in the data processing executed concurrently (in the case of YES at step S229), the processing execution control portion 21h executes facsimile transmission processing with even a blank page included or facsimile transmission processing with a blank page excluded corresponding to setting information stored as the blank sheet exclusion setting data 15b in the storage portion 15 (step S230). Thereafter, the data processing for the image data is finished. When facsimile transmission processing is not included in the data processing executed concurrently (in the case of NO at step S229), the data processing for the image data is finished as it is.

By the way, though the description has been given centering on the embodiments of an image forming apparatus and an image data processing method, the present invention is not limited to these embodiments, and the present invention may be performed in a form as a computer program for realizing a function of the image forming apparatus or a form of a computer-readable recording medium having the computer program recorded therein.

Here, the recording medium may be in any form of a disk type (for example, a magnetic disk, an optical disk and the like), a card type (for example, a memory card, an optical card and the like), a semiconductor memory type (for example, a ROM, a non-volatile memory and the like), a tape type (for example, a magnetic tape, a cassette tape and the like), and the like.

Reduction of costs and improvement in portability or versatility can be facilitated by recoding the computer program for realizing a function of the image forming apparatus or a computer program for causing a computer to execute the image data processing method in the above described embodiments in the recording medium for distribution.

In addition, the above described recoding medium is mounted in a computer, a computer program recorded in the recording medium is read out by the computer and stored in a memory, and the computer program is readout from the memory and executed by a processor (CPU: Central Processing Unit, MPU: Micro Processing Unit) provided in the computer, so that it is possible to realize a function of the image forming apparatus and to execute the image data processing method according to the present embodiments.

Moreover, the present invention is not limited to the above described embodiments and various modifications and alterations can be made within the scope of the present invention.

As described above, according to the present invention, based on setting information indicating whether or not to perform data processing of image data with a blank page excluded for each data processing, whether or not each data processing is processing which is performed with a blank page of the image data excluded is judged, and first data processing which is judged as processing which is performed with a blank page excluded is executed with a blank page excluded as well as second data processing which is judged as processing which is not performed with a blank page excluded is executed with a blank page included concurrently with the first data processing, so that a user is able to make different selection as to whether or not to include a blank page for each data processing.

The invention claimed is:

1. An image forming apparatus performing a plurality of different data processing concurrently for image data including a blank page, comprising:

a storage portion for storing setting information indicating whether or not to perform data processing of the image data with a blank page excluded for each of the data processing, and a control portion for judging whether or not each data processing is processing to be performed with a blank page of the image data excluded based on the setting information stored in the storage portion, and executing first data processing which is judged as processing to be performed with the blank page excluded by excluding the blank page as well as executing second data processing which is judged as processing performed without excluding the blank page, concurrently with the first data processing by including the blank page, wherein the plurality of different data processing is processing performed by a plurality of different functions of the image forming apparatus, the plurality of different functions includes at least two of a document filing function of image data, a data transmission function through a network, a print function, a copy function, a facsimile function, and an electronic mail transmission function, the first data processing, which cannot be used as a formal document, is executed by at least one of the document filing function of image data, the data transmission function through the network, the print function, the copy function, or the electronic mail transmission function, and the second data processing, which is treated as the equivalent of a formal document, is executed by the facsimile function, and when the first data processing is judged as processing performed with the blank page of the image data excluded, the control portion executes the first data processing excluding the blank page, and when the second data processing is judged as processing performed without excluding the blank page of the image data, the control portion executes the second data processing without excluding the blank page.

2. The image forming apparatus as defined in claim 1, wherein the control portion executes first display processing for displaying, by excluding the blank page, image data which is a processing target of the first data processing which is judged as processing performed with the blank page excluded, and executes second display processing for displaying, by including the blank page, image data which is a processing target of the second data processing which is judged as processing performed without excluding the blank page concurrently with the first display processing.

3. The image forming apparatus as defined in claim 2, wherein the control portion switches the first display processing, the second display processing executed concurrently with the first display processing, and display processing for displaying each page of the image data with the blank page included, based on an instruction from a user.

4. The image forming apparatus as defined in claim 2, wherein the control portion displays each page of image data serving as a target of the first data processing and the second data processing by thumbnail display.

5. The image forming apparatus as defined in claim 1, wherein the control portion switches processing to be executed from the first data processing or the second data processing to third data processing based on an instruction from a user, and when the third data processing is judged as processing executed with a blank page of the image data excluded, executes the third data processing with the blank page excluded, and when the third data processing is judged as processing executed without excluding the blank page of the image data, executes the third data processing without excluding the blank page.

6. The image forming apparatus as defined in claim 5, wherein the control portion displays the image data as a processing target of the third data processing with the blank page excluded when the third data processing is judged as processing executed with a blank page of the image data excluded, and when the third data processing is judged as processing executed without excluding the blank page of the image data, executes third display processing for displaying the image data as a processing target of the third data processing without excluding the blank page, in place of the first display processing corresponding to the first data processing or the second display processing corresponding to the second data processing which has been switched.

7. The image forming apparatus as defined in claim 1, wherein a plurality of the different data processing includes data processing in which a destination to which image data is transmitted is different.

8. An image data processing method for performing a plurality of different data processing concurrently for image data including a blank page, comprising:

an information reading step of reading out setting information from a storage portion storing the setting information indicating whether or not to perform data processing of the image data with a blank page excluded for each of the data processing, and a data processing executing step of judging whether or not each data processing is processing performed with a blank page of the image data excluded based on the setting information read out at the information reading step, and executing first data processing which is judged as processing performed with the blank page excluded by excluding the blank page as well as executing second data processing which is judged as processing performed without excluding the blank page, concurrently with the first data processing by including the blank page, wherein the plurality of different data processing is processing performed by a plurality of different functions of the image forming apparatus, the plurality of different functions includes at least two of a document filing function of image data, a data transmission function through a network, a print function, a copy function, a facsimile function, and an electronic mail transmission function, the first data processing, which cannot be used as a formal document, is executed by at least one of the document filing function of image data, the data transmission function through the network, the print function, the copy function, or the electronic mail transmission function, and the second data processing, which is treated as the equivalent of a formal document, is executed by the facsimile function, and when the first data processing is judged as processing performed with the blank page of the image data excluded, the control portion executes the first data processing excluding the blank page, and when the second data processing is judged as processing performed without excluding the blank page of the image data, the control portion executes the second data processing without excluding the blank page.

9. The image data processing method as defined in claim 8, further comprising:

at the data processing executing step, a display step of executing first display processing for displaying, by excluding the blank page, image data which is a processing target of the first data processing which is judged as processing performed with the blank page excluded, and executing second display processing for displaying, by including the blank page, image data which is a processing target of the second data processing which is judged as processing performed without excluding the blank page concurrently with the first display processing.

* * * * *